(12) United States Patent
Ikeda et al.

(10) Patent No.: US 8,208,771 B2
(45) Date of Patent: Jun. 26, 2012

(54) OPTICAL SWITCH

(75) Inventors: Hiromu Ikeda, Kokubunji (JP); Shohei Kobayashi, Hino (JP)

(73) Assignee: Olympus Corporation, Tokyo (JP)

( * ) Notice: Subject to any disclaimer, the term of this patent is extended or adjusted under 35 U.S.C. 154(b) by 184 days.

(21) Appl. No.: 12/878,458

(22) Filed: Sep. 9, 2010

(65) Prior Publication Data

US 2011/0064356 A1 Mar. 17, 2011

(30) Foreign Application Priority Data

Sep. 15, 2009 (JP) ................................ 2009-212704

(51) Int. Cl.
*G02B 6/42* (2006.01)
*H04J 14/02* (2006.01)

(52) U.S. Cl. ................ 385/16; 385/15; 385/18; 385/24; 385/33; 385/37; 398/79; 398/82; 398/88; 398/45; 398/48; 398/87

(58) Field of Classification Search .................... 385/15, 385/16, 17, 18, 24, 42, 33, 31, 37; 398/79, 398/82, 88, 45, 48, 87

See application file for complete search history.

(56) References Cited

U.S. PATENT DOCUMENTS

| | | | | |
|---|---|---|---|---|
| 5,917,625 | A | * | 6/1999 | Ogusu et al. ..................... 385/24 |
| 5,999,672 | A | * | 12/1999 | Hunter et al. .................... 385/37 |
| 6,657,770 | B2 | * | 12/2003 | Marom et al. ................. 359/290 |
| 7,031,611 | B2 | * | 4/2006 | Valette ............................. 398/96 |
| 7,231,110 | B2 | * | 6/2007 | Yamamoto et al. ............. 385/24 |
| 7,362,434 | B2 | * | 4/2008 | Kobayashi ..................... 356/326 |
| 2006/0067611 | A1 | * | 3/2006 | Frisken et al. .................. 385/16 |
| 2009/0110349 | A1 | * | 4/2009 | Presley et al. .................. 385/17 |
| 2011/0064356 | A1 | * | 3/2011 | Ikeda et al. ..................... 385/16 |

\* cited by examiner

*Primary Examiner* — Brian Healy
(74) *Attorney, Agent, or Firm* — Scully, Scott, Murphy & Presser, P.C.

(57) ABSTRACT

In an optical switch, fibers in a fiber array are arranged in a row. When a region where lights input into or output from the fibers in the fiber array intersect is taken as an intersecting position C, and an axis parallel to the fibers in the fiber array and passing through the intersecting position C is taken as a Z axis, then a distance δ between a core of a desired fiber among the fibers and an optical axis of a corresponding one of the lenses varies depending on a distance S of the desired fiber from the Z axis.

12 Claims, 11 Drawing Sheets

OPTICAL SWITCH

CROSS-REFERENCE TO RELATED APPLICATION

The present application is based upon and claims the benefit of priority from the prior Japanese Patent Application No. 2009-212704 filed on Sep. 15, 2009; the entire contents of which are incorporated herein by reference.

BACKGROUND OF THE INVENTION

1. Field of the Invention

The present invention relates to an optical switch.

2. Description of the Related Art

An optical switch, such as a multiplexer, is disclosed in the specification of the U.S. Pat. No. 6,657,770. In this optical switch, light beams output from a fiber array are converted into parallel beams in a micro-lens array and then led to an optical system arranged at a later stage. The parallel beams are expanded using two lenses, as shown in FIG. 5, for instance, led to a dispersive element, and subsequently concentrated and led to a mirror array.

In the optical switch disclosed in the specification of the U.S. Pat. No. 6,657,770, light emitted from the input/output port must be rendered parallel by the lens array, then concentrated using various kinds of optical elements into the deflection unit, and must again be returned to the input/output port. Downsizing of the optical switch is difficult in this configuration. Moreover, quality degradation may occur because of the sum total of the properties of various optical elements and the adjustment error. Moreover, a drawback namely, the larger the number of optical elements, the greater is the deviation from the ideal condition, cannot be avoided.

SUMMARY OF THE INVENTION

The present invention has been made in view of the above discussion. It is an object of the present invention to reduce the number of parts and to achieve downsizing of an optical switch.

To solve the above problems and to achieve the above objects, an optical switch according to an aspect of the present invention includes a fiber array made of n fibers, where n is a positive integer, that forms one or more input ports to input wavelength-multiplexed light and one or more output ports; a lens array made of n lenses each corresponding to a fiber in the fiber array; a dispersive element that disperses light output from the lens array into lights of individual wavelengths; and a deflection unit that receives the lights of individual wavelengths from the dispersive element, and selects an output port for each of the wavelengths by a plurality of deflection elements that can deflect light independently for individual wavelengths. The fibers in the fiber array are arranged in a row. When a region where lights input into or output from the fibers in the fiber array intersect is taken as an intersecting position C, and an axis parallel to the fibers in the fiber array and passing through the intersecting position C is taken as a Z axis, then a distance $\delta$ between a core of a desired fiber among the fibers and an optical axis of a corresponding one of the lenses varies depending on a distance S of the desired fiber from the Z axis.

In an optical switch according to another aspect of the present invention, when a pitch of the fibers in the fiber array is taken as P1, a pitch of the lenses of the lens array is taken as P2, a distance from an end face of the fiber array to the intersecting position C is taken as L1, and a distance from a center of the lens array to the intersecting position C is taken as L2, it is preferable that a relation given by Equation (1) below is true:

$$P2/L2 = P1/L1 \tag{1}$$

In an optical switch according to still another aspect of the present invention, it is preferable that the intersecting position C is a region with a limited width that corrects aberration.

In an optical switch according to still another aspect of the present invention, it is preferable that the intersecting position C is on the side of the deflection unit with respect to the lens array.

In an optical switch according to still another aspect of the present invention, the intersecting position C is on the side of the fibers with respect to the lens array.

In an optical switch according to still another aspect of the present invention, it is preferable that the distance S is a distance along a direction parallel to an array direction of fibers.

In an optical switch according to still another aspect of the present invention, when a distance between a core of an m-th fiber from the Z axis and the optical axis of the corresponding one of the lenses is taken as $\delta_m$, it is preferable that a relation given by Equation (2) below is true:

$$\delta_{m+1} > \delta_m \tag{2}$$

In an optical switch according to still another aspect of the present invention, it is preferable that a distance $\delta_0$ between a core of a fiber nearest to the Z axis and an optical axis of the corresponding one of the lenses is substantially zero.

In an optical switch according to still another aspect of the present invention, it is preferable that the distance S is a distance along a direction perpendicular to an array direction of fibers.

In an optical switch according to still another aspect of the present invention, it is preferable that when a distance between a core of an m-th fiber from the Z axis and the optical axis of the corresponding one of the lenses is taken as $\delta_m$, a relation given by Equation (3) below is true:

$$\delta_{m+1} > \delta_m \tag{3}$$

In an optical switch according to still another aspect of the present invention, it is preferable that the deflection unit includes a plurality of mirrors that have a function for angle adjustment and that are arranged in a direction perpendicular to an array direction of the fibers.

In an optical switch according to still another aspect of the present invention, it is preferable that the deflection unit includes a plurality of mirrors that have a function for angle adjustment and that are arranged in a direction parallel to an array direction of the fibers.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE INVENTION

Exemplary embodiments of an optical switch according to the present invention are explained below referring to accompanying diagrams. The present invention shall not be construed as being restricted by the embodiments explained below.

First Embodiment

Figure 1:
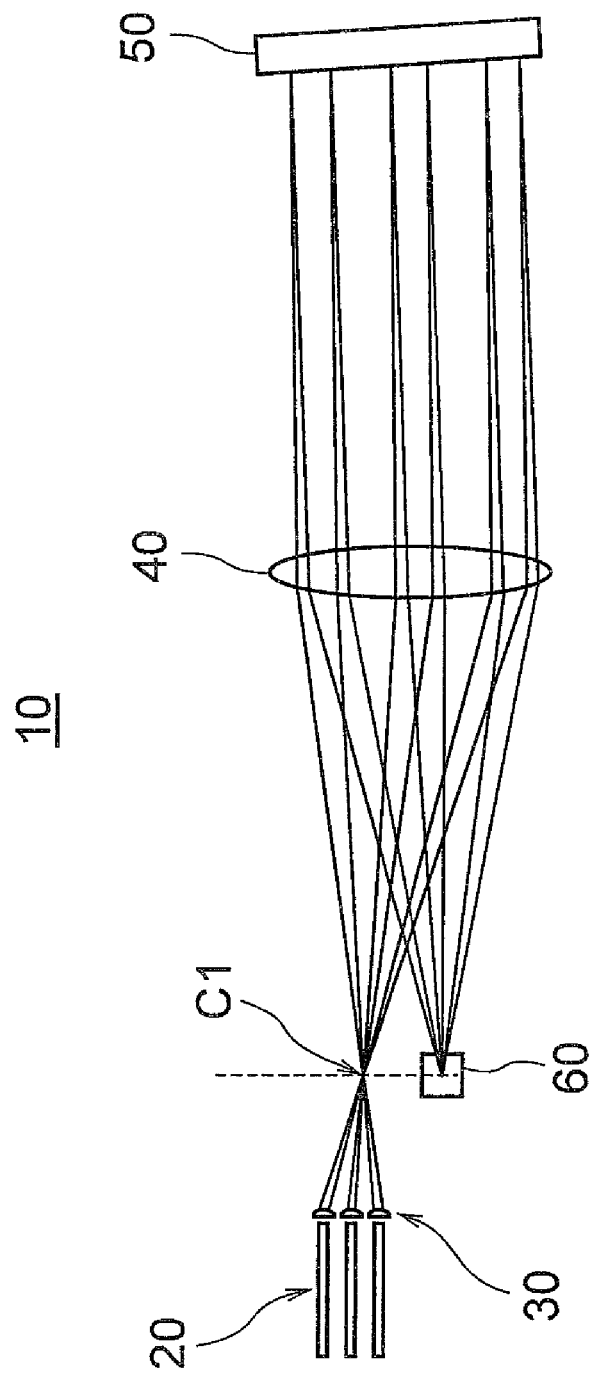
FIG. 1 is a plan view of an overall configuration of an optical switch according to a first embodiment of the present invention.
Figure 2:
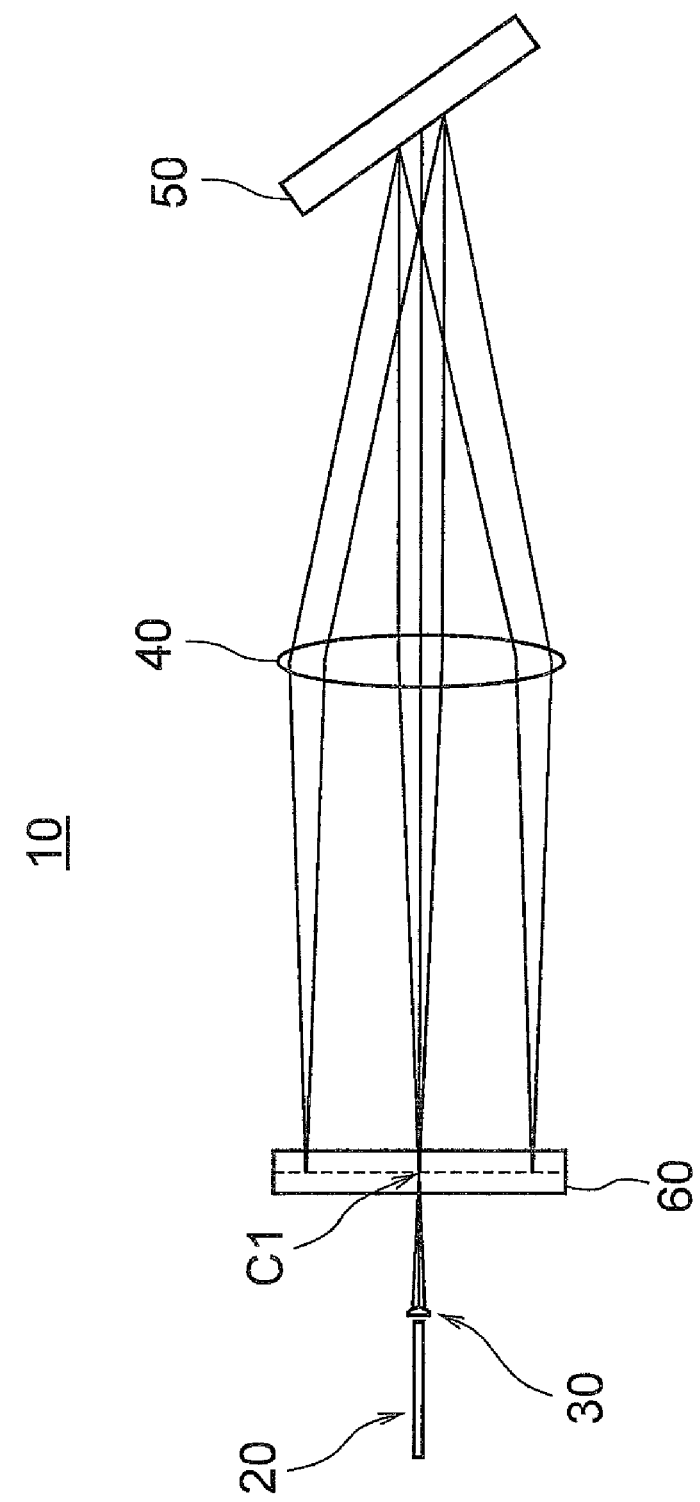
FIG. 2 is a side view of the overall configuration of the optical switch according to the first embodiment of the present invention.
Figure 3:
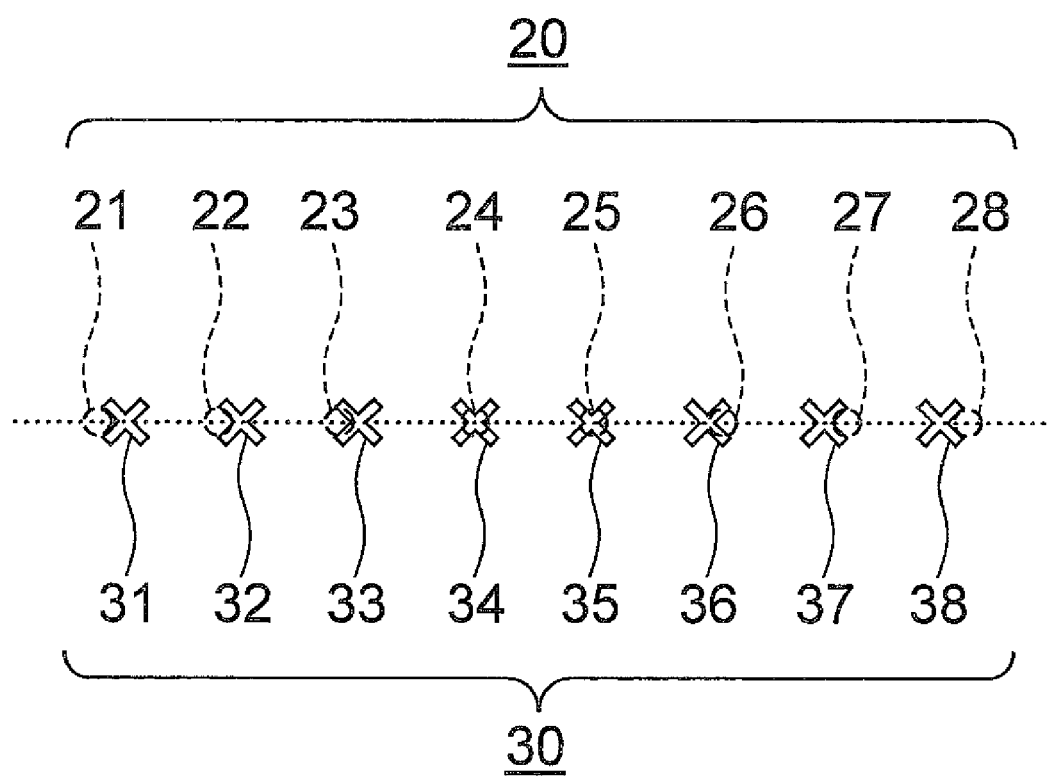
FIG. 3 is a frontal view showing a positional relationship of a fiber array and a lens array in the optical switch according to the first embodiment of the present invention.
Figure 4:
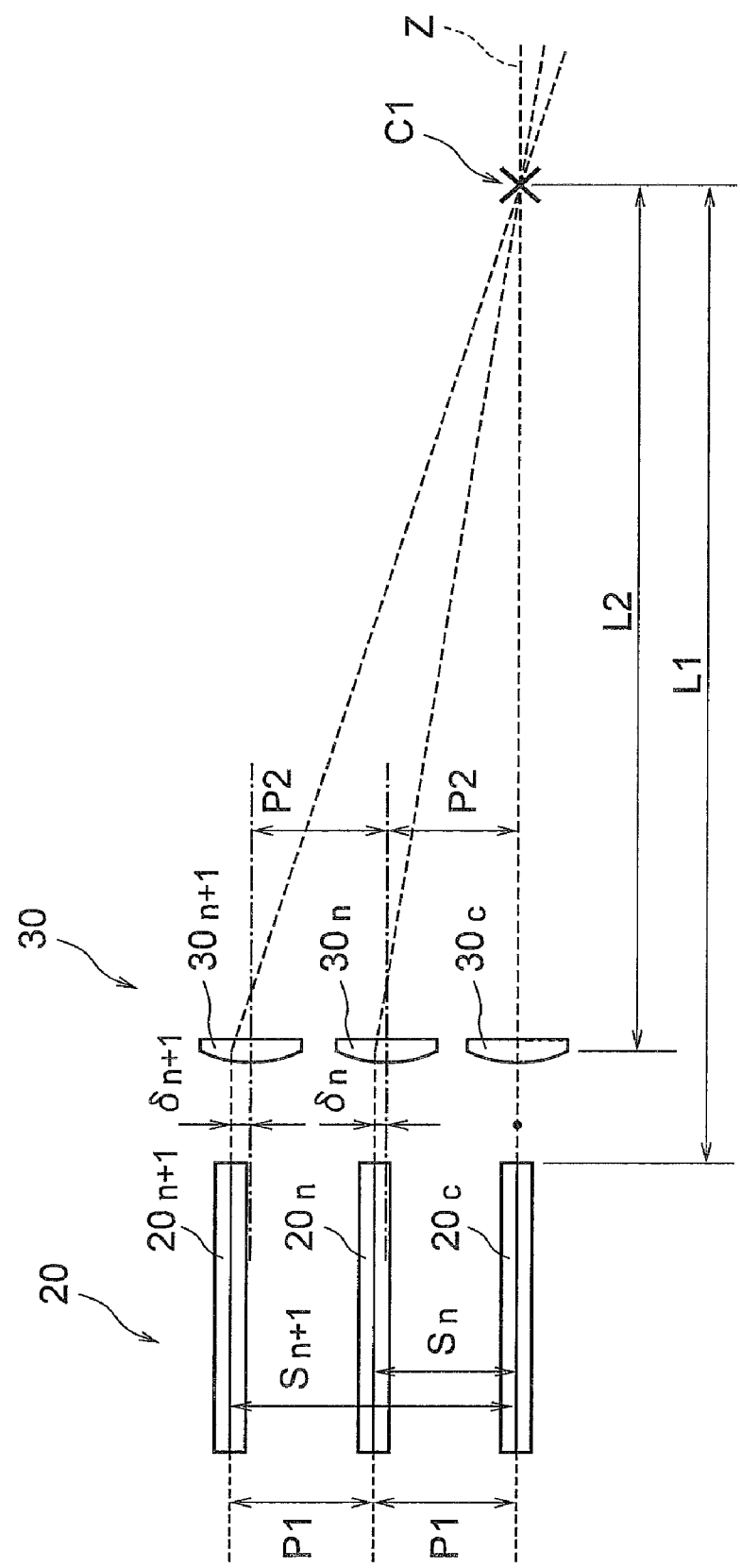
FIG. 4 is a plan view showing a positional relationship of the fiber array, the lens array, and an intersecting position according to the first embodiment of the present invention.

FIG. 1 is a plan view of an overall configuration of an optical switch 10 according to a first embodiment. FIG. 2 is a side view of the overall configuration of the optical switch 10 according to the first embodiment. FIG. 3 is a frontal view showing a positional relationship of a fiber array 20 and a lens array 30 in the optical switch 10 according to the first embodiment. FIG. 4 is a plan view showing a positional relationship of the fiber array 20, the lens array 30, and an intersecting position according to the first embodiment of the present invention.

As shown in FIGS. 1 and 2, the optical switch 10 according to the first embodiment includes the fiber array 20, the lens array 30, an optical element 40, a diffraction grating 50 used as a dispersive element, and a mirror array 60 used as a deflection unit.

The fiber array 20 includes one input fiber as an input port and n output fibers as an output port, where n is a positive integer. The lens array 30 includes a plurality of micro-lenses corresponding to the various input/output fibers in the fiber array 20. The input fiber inputs wavelength-multiplexed light. Incidentally, only a part of the fibers that form the fiber array 20 and a part of the micro-lenses that form the lens array 30 are shown in FIGS. 1 to 4.

A lens or a concave mirror may be used, for instance, as the optical element 40, to convert a light incident upon it from the lens array 30 into parallel beams. The diffraction grating 50 (grating) is arranged such that its spectral direction is in a height direction (vertical direction in FIG. 2) of the optical switch 10. The diffraction grating 50 disperses the light incident from the optical element 40 into lights of individual wavelengths. A prism or any other element may be used instead of the diffraction grating as the dispersive element.

The mirror array 60 includes a plurality of micro-mirrors disposed in a direction perpendicular to an array direction of the fibers in the fiber array 20. An angle of each of the micro-mirrors can be independently adjusted. Each of the micro-mirrors receives a light beam of a corresponding wavelength dispersed by the diffraction grating 50, and deflects the light beam independently of the other micro-mirrors; therefore, selection of output port for each wavelength can be achieved.

As shown in FIGS. 3 and 4, a pitch P1 of cores of fibers 21, 22, 23, 24, 25, 26, 27, and 28, which form the fiber array 20, and a pitch P2 of crests of micro-lenses 31, 32, 33, 34, 35, 36, 37, and 38, which form the lens array 30, are not identical. Furthermore, as shown in FIGS. 1 and 2, the fibers in the fiber array 20 and the micro-lenses in the lens array 30 are arranged such that the light beams output from the fibers in the fiber array 20 pass through the lens array 30 and then intersect at a point C1 (intersecting position C). Incidentally, the intersecting point C1 is located on the side of the mirror array 60, which is used as the deflection unit, with respect to the lens array 30.

Next, light propagation in the optical switch is explained referring to FIGS. 1 and 2. The light beams output from the input port in the fiber array 20 are concentrated by the corresponding micro-lenses of the lens array 30. The light beams concentrated by the lens array 30 after intersecting at point C1 (intersecting position C) are incident on the optical element 40. The optical element 40 has an optical concentrating action. This incident light is converted into parallel light by the optical element 40, and the parallel light is made incident on the diffraction grating 50.

The light beams incident on the diffraction grating 50 are made incident, after they are passed again through the optical element 40 that has an optical concentrating action, on the mirror array 60 for each wavelength. After an angle of each of the light beams is changed by the mirror array 60, the light beams take an opposite path, and they are merged together in a certain output fiber in the fiber array 20. The position of the output fiber in which the beams merge is selected by a deflection angle of each of the micro-mirrors in the mirror array 60.

Incidentally, the positional relationship between the fibers that form the fiber array 20 and the micro-lenses that form the lens array 30 is explained referring to FIG. 4.

As shown in FIG. 4, assume that the fiber array 20 includes fibers $20_c$, $20_n$, and $20_{n+1}$, while the lens array 30 includes micro-lenses $30_c$, $30_n$, and $30_{n+1}$, corresponding to the fibers $20_c$, $20_n$, and $20_{n+1}$, respectively.

The fibers $20_c$, $20_n$, and $20_{n+1}$, are each arranged in a row at the constant pitch P1. The fiber $20_c$ is arranged such that its core falls on a Z axis passing through the intersecting point C1 where lights input into or output from the fibers $20_c$, $20_n$, and $20_{n+1}$ (micro-lens $30_c$, $30_n$, and $30_{n+1}$) intersect. A distance between the Z axis and the fiber $20_n$ is $S_n$, and a distance between the Z axis and the fiber $20_{n+1}$ is $S_{n+1}$, along the direction parallel to the array direction of fibers in the fiber array 20, that is, along a width direction of the optical switch 10 (vertical direction in FIGS. 1 and 4). Moreover, distances between end faces of the fibers $20_c$, $20_n$, and $20_{n+1}$, on the side of the lens array 30 and the point C1 are respectively equal to L1.

The micro-lenses $30_c$, $30_n$, and $30_{n+1}$, are arranged parallel to each other in this order at the constant pitch P2. The micro-lens $30_c$ is arranged such that its optical axis falls on the Z axis. A distance between a core of the fiber $20_n$ and the optical axis of the micro-lens $30_n$ is $\delta_n$, while a distance between a core of the fiber $20_{n+1}$ and the optical axis of the micro-lens $30_{n+1}$ is $\delta_{n+1}$. Distances between optical centers of the micro-lenses $30_c$, $30_n$, and $30_{n+1}$, and the point C1 are respectively equal to L2. Regardless of the example shown in FIG. 4, a distance of a fiber nearest to the Z axis should preferably be substantially zero. "Substantially zero" includes zero.

A relation given by Equation (1) below between the distance L1, the distance L2, the pitch P1 of the fiber array 20, and the pitch P2 of the lens array 30 is true for the optical switch 10:

$$P2/L2 = P1/L1 \quad (1)$$

A relation given by Equation (2) below is also true for the optical switch 10:

$$\delta_{m+1} > \delta_m \quad (2)$$

Incidentally, $\delta_m$ is a distance between a core of an m-th fiber from the Z axis and an optical axis of a corresponding one of the lenses.

$\delta_{m+1}$ is a distance between a core of an (m+1)-th fiber from the Z axis and an optical axis of the corresponding one of the lenses. Incidentally, $\delta_m$ and $\delta_{m+1}$ are just examples of the distances between the cores of the fibers and the optical axes of the corresponding lenses.

The pitch P2 of the lens array is not the same as the pitch P1 of the fiber array in the optical switch according to the present invention. The pitch P2 of the lens array 30 is smaller than the pitch P2 of the fiber array 20 in the optical switch 10 according to the first embodiment. Each micro-lens constituting the lens array 30 has the function of not only output light from the fiber array 20 or changing the deflection angle of light incident on the fiber array 20, but also has the function of changing the optical axis of each of fibers in the fiber array to different angles. Accordingly, the same function as that of a conventional lens array plus that of an optical element can be achieved by using only one lens array. Therefore, the number of parts can be reduced and downsizing can be achieved.

According to the optical switch 10 of the first embodiment, the pitch of the fibers in the fiber array 20 is constant, and the pitch of the micro-lenses in the lens array 30 is also constant. If the lenses that form the lens array 30 can be treated as being in an aberration-free range, the lens array 30 can concentrate the light to one point even with the constant pitch. However, an optimized variable pitch is more advantageous considering off-axis aberration of the lenses that form the lens array 30 for perfect concentration of light at one point. Similarly, an optimized variable pitch is also preferable for the fibers that form the fiber array 20.

Incidentally, the light beam passing through the fiber array and the lens array in the optical switch described in the U.S. Pat. No. 6,657,770, is incident parallelly on a grating, which is a dispersive element. In such a configuration, when diameters of light beams are made smaller than the sub millimeter range, the light beams tend to spread and interfere with each other. Therefore, port spacing must be in the order of a few millimeters, and a multiport wavelength selector switch cannot be configured. In contrast, the optical switch 10 according to the first embodiment can incline the optical axis of each of the ports (fibers) in the fiber array 20 because of the positional relationship of the fiber array 20 and the lens array 30. Therefore, there is no interference between the ports, and a multiport wavelength selector switch can be achieved.

Second Embodiment

Figure 5:
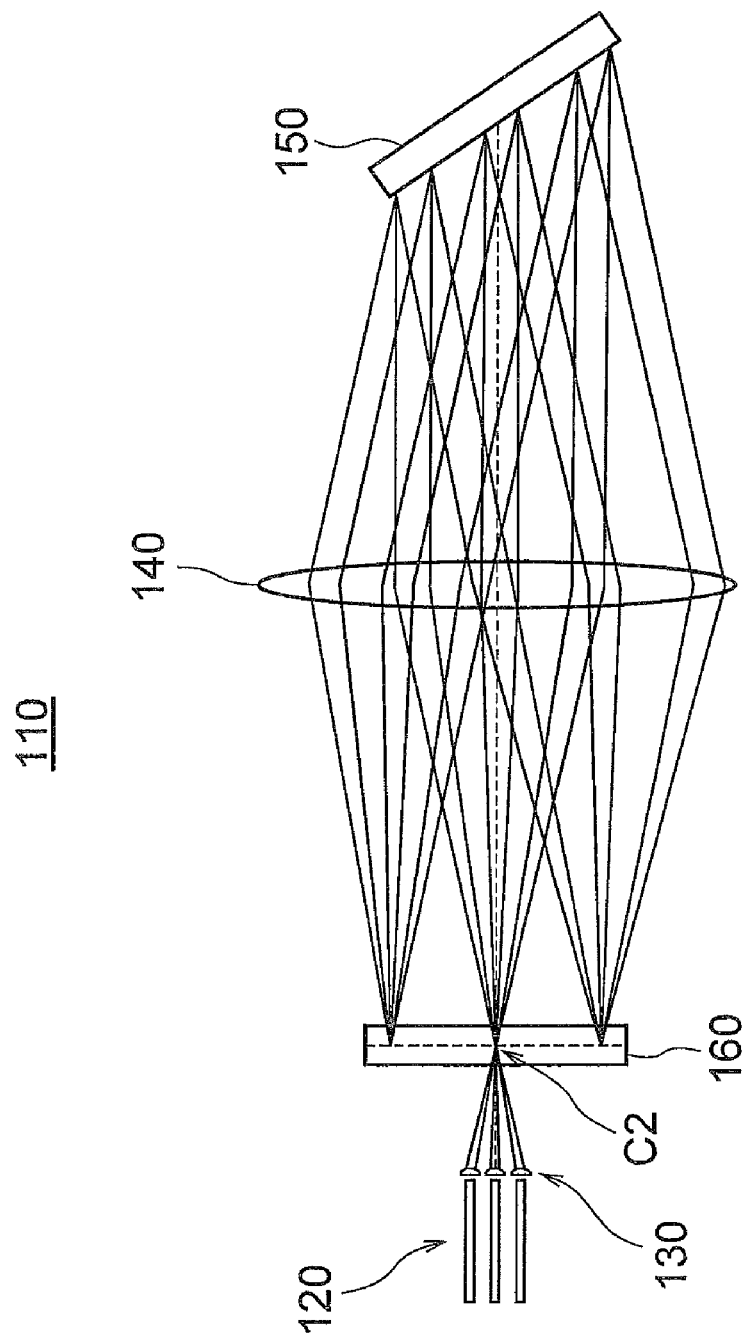
FIG. 5 is a plan view of an overall configuration of an optical switch according to a second embodiment of the present invention.
Figure 6:
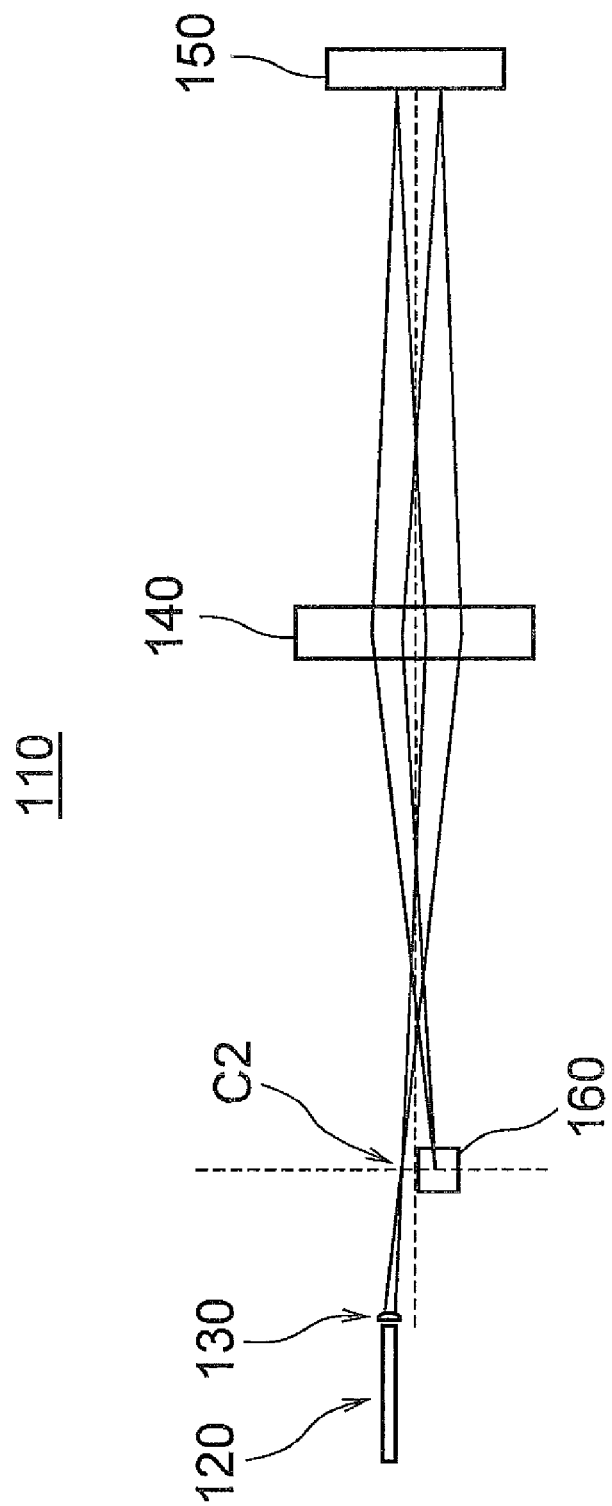
FIG. 6 is a side view of the overall configuration of the optical switch according to the second embodiment of the present invention.

FIG. 5 is a plan view of an overall configuration of an optical switch 110 according to a second embodiment. FIG. 6 is a side view of the overall configuration of the optical switch 110 according to the second embodiment.

The optical switch 110 according to the second embodiment includes a diffraction grating 150 (grating) used as a dispersive element having the same spectral direction as an array direction of fibers in a fiber array 120. That is, the spectral direction of the diffraction grating 150 is a width direction (vertical direction in FIG. 5) of the optical switch 110. Therefore, the array direction of the fibers in the fiber array 120 is the array direction of mirrors in a mirror array 160, so that an extremely compact optical system can be achieved.

The optical switch 110 according to the second embodiment includes the fiber array 120, a lens array 130, an optical element 140, the diffraction grating 150 used as a dispersive element, and the mirror array 160 used as a deflection unit. Other than the array direction of the fibers in the fiber array 120, which is made the same as the spectral direction of the diffraction grating 150, the configuration of the optical switch according to the second embodiment is the same as the configuration of the optical switch 10 according to the first embodiment; therefore, detailed explanations are omitted. Incidentally, as shown in FIGS. 5 and 6, light beams output from the fibers of the fiber array 120 intersect at a point C2 (intersecting position C) after passing through the lens array 130.

In addition to the advantages of the optical switch 10 according to the first embodiment, considerably small size on an aspect side (size in a height direction) can be achieved in the optical switch 110 according to the second embodiment, and a compact optical system can thus be realized.

Moreover, because the array direction of the fibers in the fiber array 120, the array direction of the lenses in the lens array 130, and the array direction of the mirrors in the mirror array 160 are all the same, the optical axis is substantially on the same plane, and an optical switch with excellent ease of assembly can be achieved.

As shown in FIG. 6, although positions in the height direction of the fiber array 120 and of the mirror array 160 are not exactly the same, perfect disposition on the same plane can be achieved by arranging the fiber array 120 by the side of the mirror array 160 in the optical switch 110 according to the second embodiment.

Third Embodiment

Figure 7:
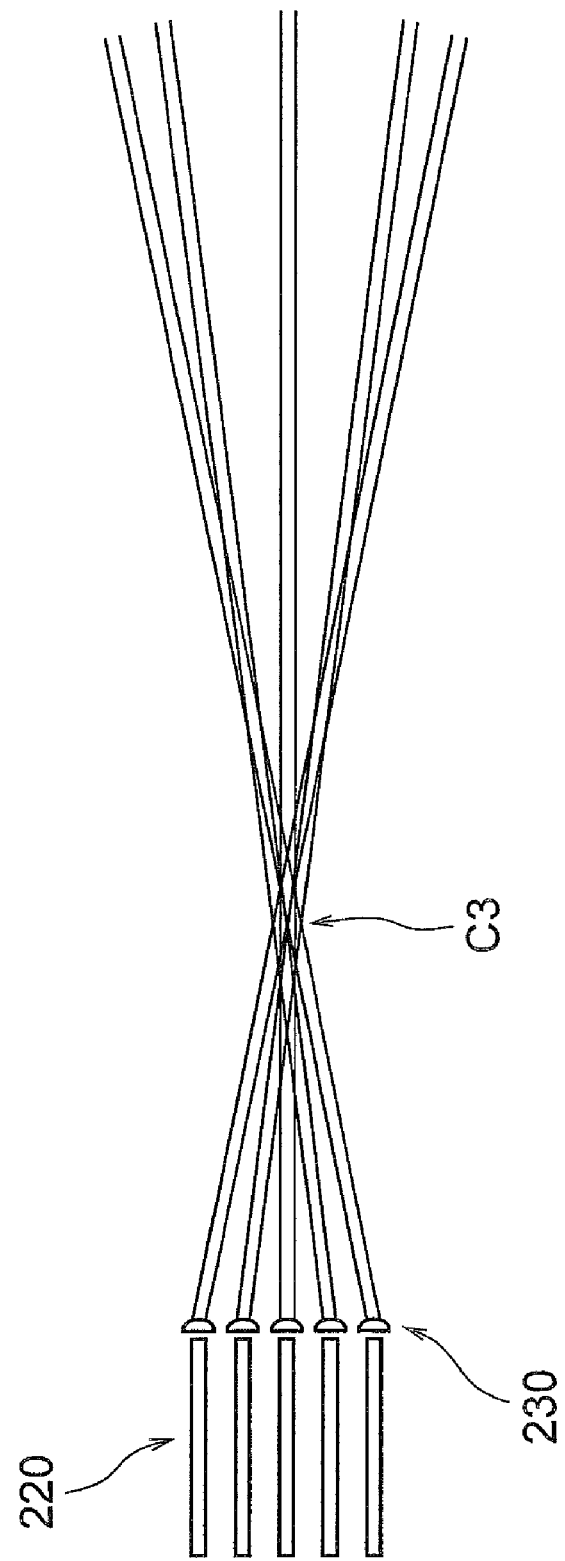
FIG. 7 is a plan view showing a positional relationship of a fiber array, a lens array, and an intersecting position according to a third embodiment of the present invention.

FIG. 7 is a plan view showing a positional relationship of a fiber array 220, a lens array 230, and an intersecting position C3 (intersecting position C) according to a third embodiment. FIG. 7 shows the fiber array 220, the lens array 230, and only the lights output from the lens array 230 included in an optical switch of the third embodiment. The other configuration is similar to that of the optical switch 10 according to the first embodiment.

In the fiber array 220 and the lens array 230 according to the third embodiment, the lights output from the micro-lenses in the lens array 230 do not intersect at one point as in the first and second embodiments, but pass through the intersecting position C3 that is a region with a certain width. To achieve this configuration, the lens array 230 is arranged such that a position of an optical axis of the lenses in the lens array 230 varies according to the position of the fibers in the fiber array 220, corresponding to the axis that passes through a center of the intersecting position C3.

By configuring the optical switch in this way using the fiber array 220 and the lens array 230, complete correction can be achieved of aberration and curvature of image field that occur in an optical system arranged after the intersecting position C3. If a lights output from the lens array in the conventional optical switch is incident on an optical element having spherical surfaces, the further outside the axis of the spherical optical element the light beam is, the closer is the displacement of the focus of the light beam. In contrast, by adopting a configuration such as the one according to the third embodiment, complete correction of aberration can be achieved.

The intersecting position C3 should preferably be of a limited width for correcting aberration. When the intersecting position C3 satisfies this condition, by merely combining the fiber array 220 and the lens array 230, optical advantages can be realized similar to the case when an aspherical lens with superior optical characteristics is used in addition to the fiber array 220 and the lens array 230. Such a configuration can achieve an optical switch with very superior passband characteristics and reduced insertion loss characteristics.

Fourth Embodiment

Figure 8:
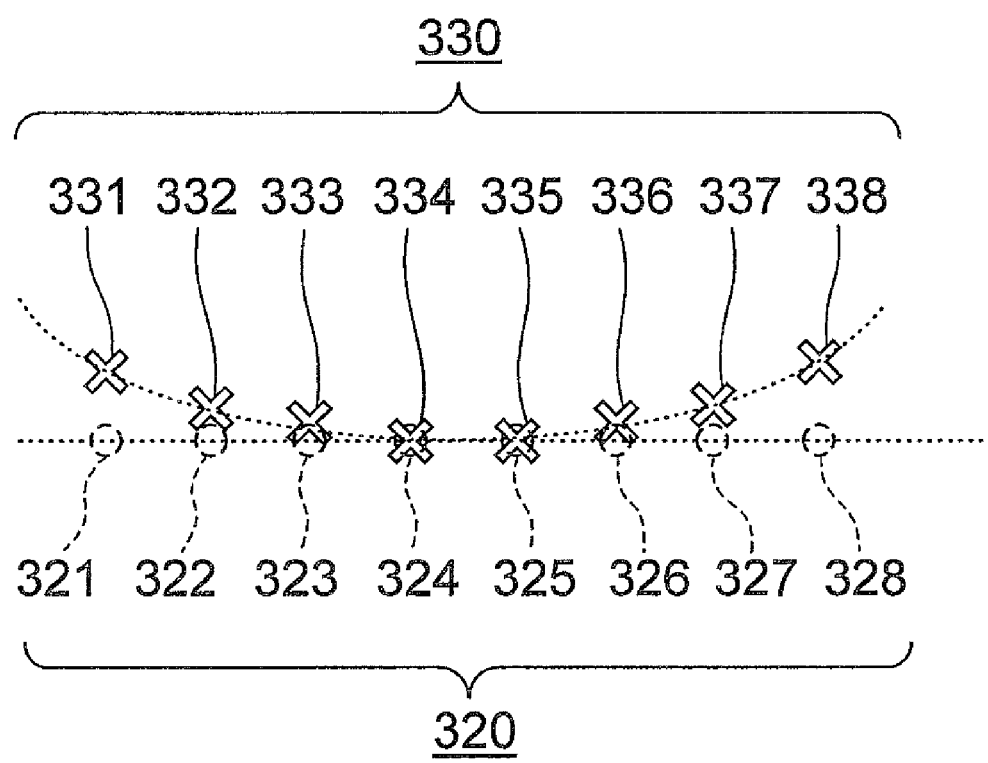
FIG. 8 is a frontal view showing a positional relationship of a fiber array and a lens array in an optical switch according to a fourth embodiment of the present invention.

FIG. 8 is a frontal view showing a positional relationship of a fiber array 320 and a lens array 330 in an optical switch according to a fourth embodiment. FIG. 8 shows the fiber array 320, the lens array 330, positions of cores of fibers in the fiber array 320 when seen from a direction of emission of light rays, and positions of optical axes of lenses in the lens array 330, which form the optical switch.

A pitch in a direction (vertical direction in FIG. 8) perpendicular to an array direction (left-right direction in FIG. 8) of the fibers 321, 322, 323, 324, 325, 326, 327, and 328 in the fiber array 320, is different from each other, in the fiber array 320 and the lens array 330, in the fourth embodiment. Moreover, the optical axes of the micro-lenses 331, 332, 333, 334, 335, 336, 337, and 338, in the lens array 330 are arranged on a circular arc and not arranged on a straight line as in the first, second, and third embodiments. The other configuration is similar to that of the optical switch 10 according to the first embodiment.

A relation given by Equation (2) below is true for the optical switch according to the fourth embodiment:

$$\delta_{m+1} > \delta_m \qquad (2)$$

Incidentally, $\delta_m$ is a distance between a core of an m-th fiber from a Z axis and an optical axis of a corresponding lens. $\delta_{m+1}$ is a distance between a core of an (m+1)-th fiber from the Z axis and an optical axis of the corresponding lens.

By configuring the optical switch as described above using the fiber array 320 and the lens array 330, not only is it possible to change angles of lights output from the lens array 330 within a plane that includes the array direction of the fibers in the fiber array 320, but also it is possible to change the angles in a direction perpendicular to the array direction of the fibers (vertical direction in FIG. 8) in the fiber array 320.

As a consequence of the above, flexibility in optical design is increased; because, an angle of incidence of an optical element arranged after the lens array 330 can be corrected, and a more compact and highly functional optical switch can be realized.

In the fourth embodiment, the fibers 321, 322, 323, 324, 325, 326, 327, and 328 in the fiber array 320 were lined up on a straight line, while the micro-lenses 331, 332, 333, 334, 335, 336, 337, and 338 in the lens array 330 were lined up on a circular arc. Conversely, however, similar advantages can be achieved even if the fibers in the fiber array are lined up on a circular arc and the micro-lenses in the lens array are lined up on a straight line. Furthermore, similar advantages can be achieved even if both the fiber array and the lens array are lined up on a circular arc.

The lens array was arranged on a circular arc in the fourth embodiment; however, optimum optical performance can be achieved by selecting parabola, ellipse, exponential curve, sine curve, or any arbitrary curve instead of a circular arc, depending on the configuration of the optical system.

Fifth Embodiment

Figure 9:
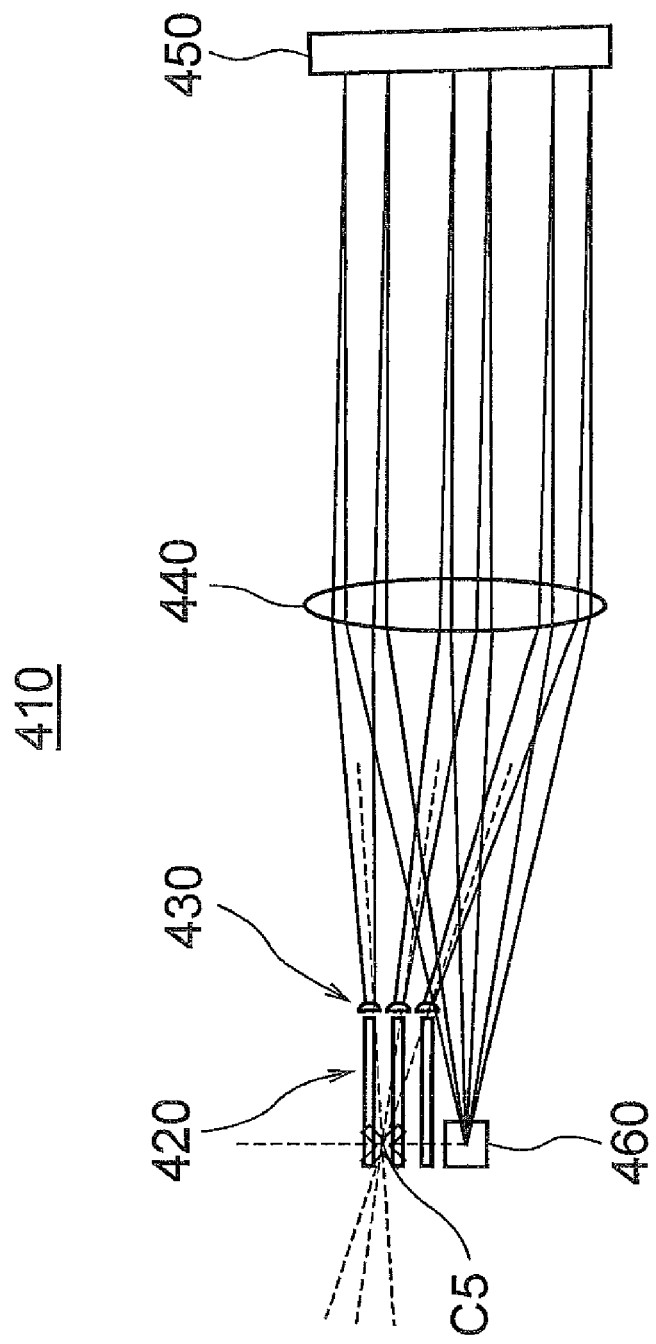
FIG. 9 is a plan view of an overall configuration of an optical switch according to a fifth embodiment of the present invention.
Figure 10:
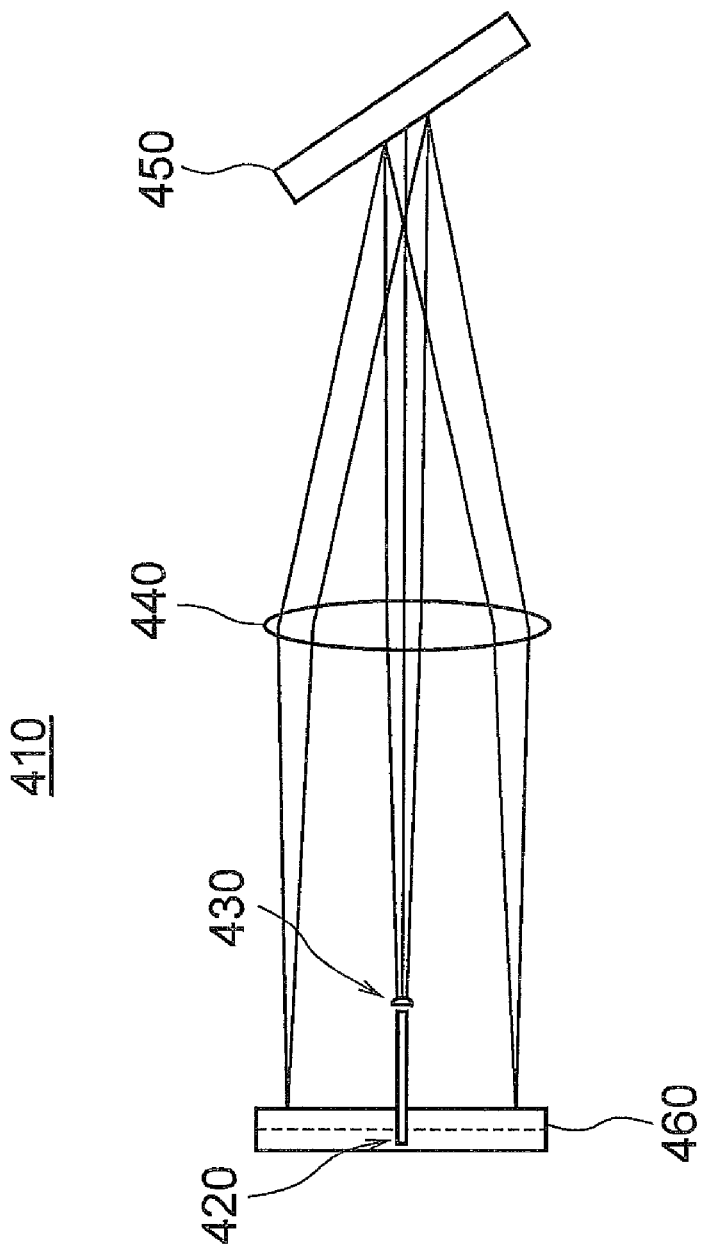
FIG. 10 is a side view of the overall configuration of the optical switch according to the fifth embodiment of the present invention.
Figure 11:
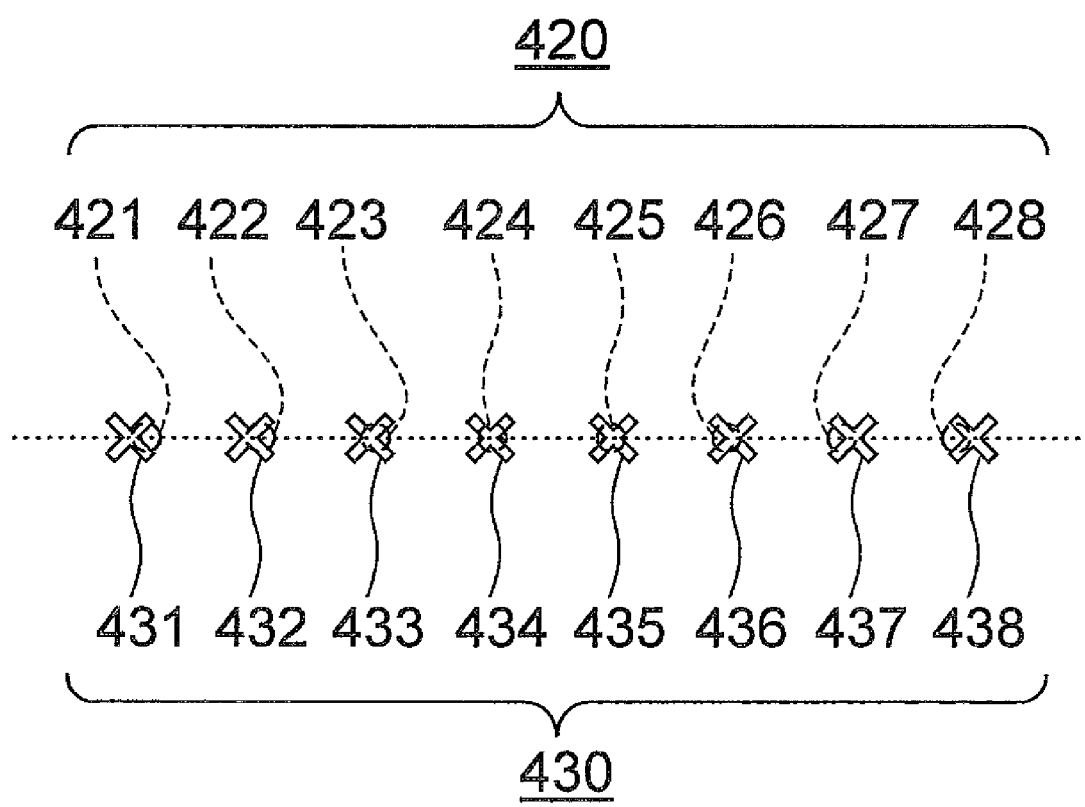
FIG. 11 is a frontal view showing a positional relationship of a fiber array and a lens array in the optical switch according to the fifth embodiment of the present invention.

FIG. 9 is a plan view of an overall configuration of an optical switch 410 according to a fifth embodiment. FIG. 10 is a side view of the overall configuration of the optical switch 410 according to the fifth embodiment. FIG. 11 is a frontal view showing a positional relationship of a fiber array 420 and a lens array 430 in the optical switch 410 according to the fifth embodiment.

A pitch of cores of fibers 421, 422, 423, 424, 425, 426, 427, and 428 in the fiber array 420, and a pitch of optical axes of micro-lenses 431, 432, 433, 434, 435, 436, 437, and 438 in the lens array 430 are not identical in the optical switch 410 according to the fifth embodiment.

Moreover, the fibers 421, 422, 423, 424, 425, 426, 427, and 428, and the micro-lenses 431, 432, 433, 434, 435, 436, 437, and 438 are disposed such that the light beams output from the fibers 421, 422, 423, 424, 425, 426, 427, and 428 intersect at a point C5 (intersecting position C) after the lens array 430.

In other words, the focal point C5 as the intersecting position C, is on the side of the fiber array 420 with respect to the lens array 430. Accordingly, the optical switch according to this embodiment differs from the optical switch according to the first, second, third, and fourth embodiments in which the focal point was on the side of the diffraction grating (deflection unit) with respect to the lens array.

The other configuration is similar to that of the optical switch 10 according to the first embodiment. That is, the optical switch 410 according to the fifth embodiment includes the fiber array 420, the lens array 430, an optical element 440, a diffraction grating 450 used as a dispersive element, and a mirror array 460 used as the deflection unit.

Incidentally, if a distance between end faces of fibers in the fiber array 420 on the side of the lens array 430 and the intersecting point C5 is taken as L3, a distance between optical centers of micro-lenses in the lens array 430 and the intersecting point C5 is taken as L4, a pitch of the fiber array 420 taken as P1, and a pitch of the lens array 430 taken as P2, then Equation (3) below is true, similar to Equation (1) in the first embodiment:

$$P2/L4 = P1/L3 \qquad (3)$$

In addition to the advantages of the conventional fiber array and lens array, optical advantages similar to those obtained when a concave lens is used in addition to the fiber array 420 and the lens array 430, can be achieved by just the fiber array 420 and the lens array 430 in the optical switch 110 according to the fifth embodiment.

Moreover, by configuring the fiber array 420 and the lens array 430 as mentioned above, advantages similar to those of a concave lens can be achieved, and compared to the advantages of a convex lens, a distance between the input/output port formed by the fiber array 420 and the optical element 440 is smaller, and a more compact wavelength-selectable switch can be achieved.

As explained above, the optical switch according to the present invention is configured such that the pitch of the input/output ports in the fiber array does not coincide with the pitch of the micro-lenses in the lens array. By making the pitch of the lens array different from the pitch of the input/output ports, the function of independently deflecting the optical axis of each fiber in the lens array can be advantageously provided. An optical switch with lesser components and with superior passband characteristics and reduced insertion loss can be achieved, which are very important characteristics in an optical switch.

According to the optical switch of the present invention, configuration of a wavelength-selectable switch can be achieved without using any optical parts other than fiber array, lens array, concave mirror, grating, and micro-mirror. The optical system of the wavelength-selectable switch has a large number of parts, and considerable man-hours are necessary for assembly and adjustment. The parts to be adjusted can be reduced by reducing the number of components. The assembly and adjustment is simple and lower costs can be realized. Moreover, from the performance aspect also, an optical switch with superior passband characteristics and reduced insertion loss characteristics can be achieved because the number of parts is small.

As explained above, the optical switch according to the present invention is suitable for applications that require reduced number of parts and compact size.

The optical switch according to the present invention is advantageous in reducing the number of parts, and as a consequence making the switch compact.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical switch comprising:
a fiber array made of n fibers that forms one or more input ports to input wavelength-multiplexed light and one or more output ports;
a lens array made of n lenses each corresponding to a fiber in the fiber array;
a dispersive element that disperses light output from the lens array into lights of individual wavelengths; and
a deflection unit that receives the lights of individual wavelengths from the dispersive element, and selects an output port for each of the wavelengths by a plurality of deflection elements that can deflect light independently for individual wavelengths, wherein
the fibers in the fiber array are arranged in a row,
when a region where lights input into or output from the fibers in the fiber array intersect is taken as an intersecting position C, and an axis parallel to the fibers in the fiber array and passing through the intersecting position C is taken as a Z axis, then a distance δ between a core of a desired fiber of the fiber array and an optical axis of a corresponding lens of the lens array varies depending on a distance S of the desired fiber from the Z axis.

2. The optical switch according to claim 1, wherein
when a pitch of the fibers in the fiber array is taken as P1, a pitch of the lenses of the lens array is taken as P2, a distance from an end face of the fiber array to the intersecting position C is taken as L1, and a distance from a center of the lens array to the intersecting position C is taken as L2, then a relation given by Equation (1) below is true:

$$P2/L2 = P1/L1 \qquad (1).$$

3. The optical switch according to claim 1, wherein
the intersecting position C is a region with a limited width that corrects aberration.

4. The optical switch according to claim 1, wherein
the intersecting position C close the side of the deflection unit compared with the lens array.

5. The optical switch according to claim 1, wherein
the intersecting position C close the side of the fibers with respect to the lens array.

6. The optical switch according to claim 1, wherein
the distance S is a distance along a direction parallel to an array direction of fibers.

7. The optical switch according to claim 6, wherein
when a distance between a core of an m-th fiber from the Z axis and the optical axis of the corresponding one of the lenses is taken as $\delta_m$, a relation given by Equation (2) below is true:

$$\delta_{m+1} > \delta_m \qquad (2).$$

8. The optical switch according to claim 7, wherein
a distance $\delta_0$ between a core of a fiber nearest to the Z axis and an optical axis of the corresponding lens of the lens array is substantially zero.

9. The optical switch according to claim 1, wherein
the distance S is a distance along a direction perpendicular to an array direction of fibers.

10. The optical switch according to claim 9, wherein
when a distance between a core of an m-th fiber from the Z axis and the optical axis of the corresponding one of the lenses is taken as $\delta_m$, a relation given by Equation (3) below is true:

$$\delta_{m+1} > \delta_m \qquad (3).$$

11. The optical switch according to claim 1, wherein
the deflection unit includes a plurality of mirrors that have a function for angle adjustment and that are arranged in a direction perpendicular to an array direction of the fibers.

12. The optical switch according to claim 1, wherein
the deflection unit includes a plurality of mirrors that have a function for angle adjustment and that are arranged in a direction parallel to an array direction of the fibers.

* * * * *